United States Patent [19]

Gölitz

[11] 3,959,990
[45] June 1, 1976

[54] ASSEMBLY FOR MOUNTING AN ELECTRIC MOTOR ON A GEARBOX

[75] Inventor: Friederich Gölitz, Wuppertal, Germany

[73] Assignee: Maschinenfabrik Ernst Thielenhaus, Wuppertal-Barmen, Germany

[22] Filed: Sept. 23, 1974

[21] Appl. No.: 508,694

[30] Foreign Application Priority Data
Sept. 21, 1973   Germany............................ 2347523
Jan. 17, 1974   Germany............................ 2402067

[52] U.S. Cl............................. 64/27 NM; 64/1 V; 64/11 R
[51] Int. Cl.²......................................... F16D 3/14
[58] Field of Search .............. 64/1 V, 11 R, 27 NM, 64/27 R, 23, 13

[56] References Cited
UNITED STATES PATENTS

| 2,154,385 | 4/1939 | Reising............................ 64/27 NM |
| 2,297,005 | 9/1942 | Livingston...................... 64/27 NM |
| 2,505,120 | 4/1950 | Jackson.......................... 64/27 NM |
| 2,560,958 | 7/1951 | King................................. 64/11 R |
| 3,363,435 | 1/1968 | Crow............................... 64/27 NM |
| 3,621,675 | 11/1971 | Conaghan et al. ............. 64/27 NM |

*Primary Examiner*—Allan D. Herrmann
*Assistant Examiner*—Randall Heald
*Attorney, Agent, or Firm*—Karl F. Ross; Herbert Dubno

[57] ABSTRACT

An assembly for connecting the output shaft of an electric motor or the like to the input of a gearbox or the like comprises a rigid housing having one side flanged to the motor and another side flanged to the gearbox. A rigid connecting sleeve is journaled in the housing and rotatable about an axis extending between the motor and the gearbox. A pinion meshing with the input of the gearbox has a short mounting shaft which is cemented into one end of the sleeve. The output shaft of the motor is keyed to a hub received in the other end of the sleeve. A plurality of matching outwardly open recesses on the hub are alignable with similar inwardly open recesses in the sleeve and connecting members each comprising a steel rod surrounded by an elastomeric layer are received in these recesses so as rotationally to link the hub to the sleeve. Misalignment of the motor output shaft with the input of the gearbox is therefore compensated for by these elastic connecting members.

7 Claims, 5 Drawing Figures

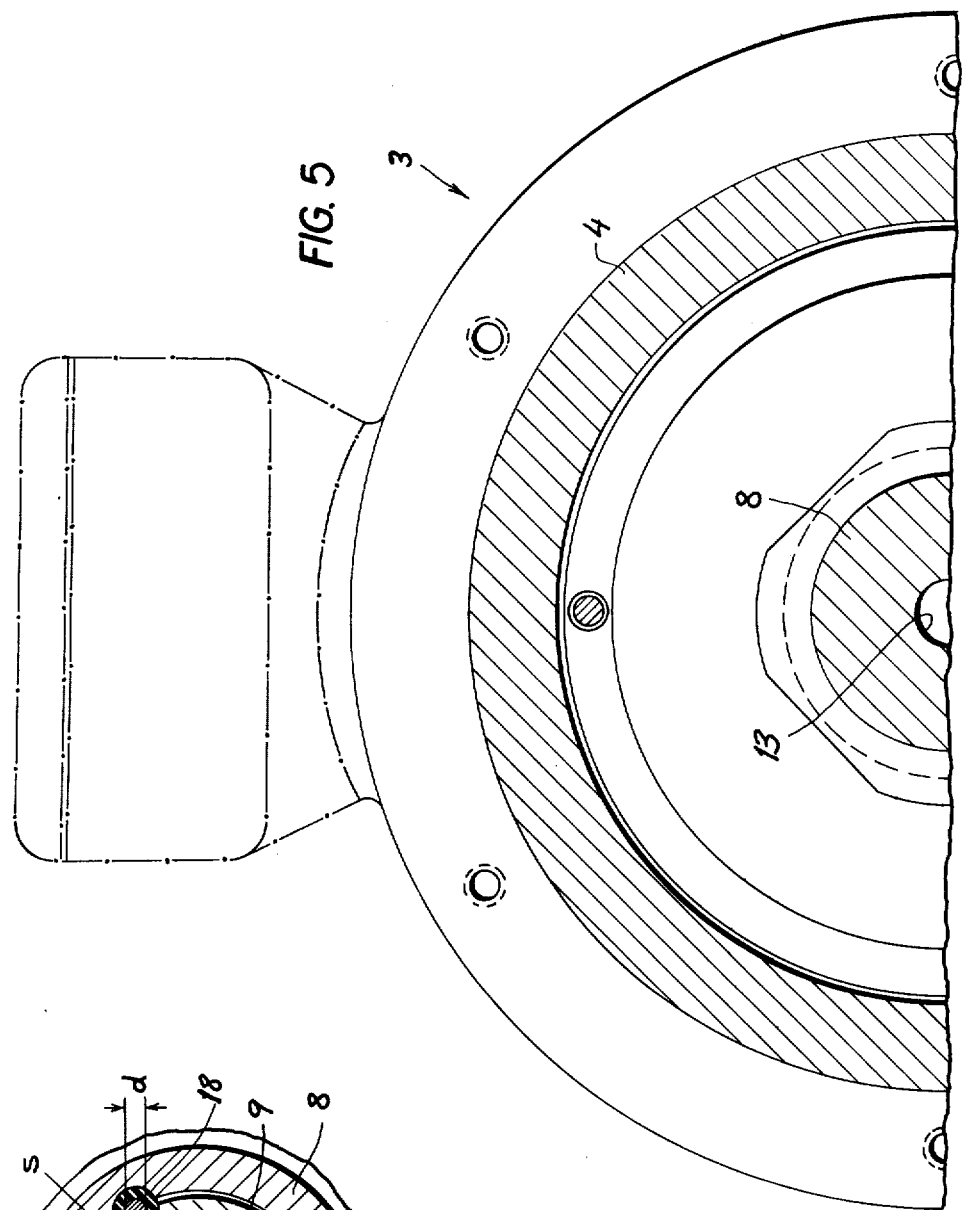
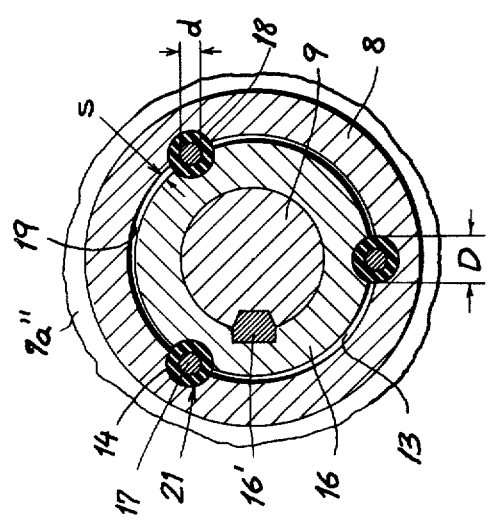

ASSEMBLY FOR MOUNTING AN ELECTRIC MOTOR ON A GEARBOX

FIELD OF THE INVENTION

The present invention relates to an assembly for connecting an electric motor to a gearbox. More particularly, this invention concerns such an assembly designed to connect the stump output shaft of the electric motor to the input gear of such a gearbox.

BACKGROUND OF THE INVENTION

It is known to connect an electric motor or the like to a gearbox by means of a so-called lantern assembly which comprises basically a rigid lantern housing having on one side a flange adapted to be bolted to the motor and on the other side a flange adapted to be bolted to the gearbox, a so-called lantern shaft extending through the housing and carrying a pinion adapted to mesh with the gears of the gearbox, and a device for connecting the other end of this shaft to the output shaft of the electric motor. Of course, such a device can be used with a transmission or virtually any output device, and the input can be connected to an electric motor, an internal combustion engine, or the like. Indeed the input and output sides can be reversed if desired. Such an arrangement is particularly necessary when one is mounting on a gearbox a motor which is not identical to that originally supplied by the manufacturer but conforms to the new international standard. Thus the connector assembly effectively functions as an adaptor.

In such devices the connector shaft between the motor output shaft and the pinion is usually provided with an elastic coupling. This is necessary in order to compensate for unavoidable misalignments of the axis of rotation in these two elements. If such compensation is not allowed the service life of the motor and/or of the gearbox is drastically reduced.

Such elastic coupling have considerable disadvantage, however, that they increase the overall length of the connector assembly. Thus, the motor is mounted at a relatively great distance from the gearbox so as to form a clumsy overall unit.

OBJECTS OF THE INVENTION

It is therefore an object of the present invention to provide am improved assembly for connecting an electric motor or the like to a gearbox.

More particularly it is an object of this invention to provide such an assembly for connecting the output shaft of an electric motor to a pinion connected to the input of a gearbox or the like.

Yet another object is the provision of such device which has a very short overall length and a long service life.

SUMMARY OF THE INVENTION

These objects are attained according to the present invention in such an assembly which has a rigid connecting body journaled in the housing and rotatable about an axis so as to extend between the flanged sides of the housing. This connecting body has one end turned toward the transmission and provided with a pinion connected to the input of the transmission and another end turned toward the motor and having axial bore at least partially receiving the motor output shaft. At least one elastic member angularly fixed to the motor output shaft and to the rigid connecting body serves to rotationally interconnect the two. Thus this elastic member allows for a certain amount of play and misalignment between the connecting body and the motor output shaft while in no way increasing the overall length of the assembly.

In accordance with another feature of this invention the connecting body is a sleeve formed with a stepped bore. The pinion is mounted on a pin received in the bore at the one end of the sleeve. This pin is held in place according to the present invention by adhesive.

According to yet another feature of this invention the motor shaft defines with the inner wall of the bore at the other end of the sleeve an annular space. A plurality of elastic connecting members are received within this space. To this end the inside of the bore and the outside of the motor output shaft are formed with in-line recesses that receive the elastic connecting members. These recesses are angularly equispaced about the respective rotation axes of the sleve and the shaft.

According to this invention the motor shaft includes a central output rod and a hub keyed or otherwise mounted rigidly thereon. This hub is formed with a plurality of outwardly open and angularly spaced seats in which the connecting members are received.

According to another feature of this invention the lantern housing is additionally provided with a brake and/or flyback suppressor (i.e. a mechanical device controlling relative movement of the lantern housing and shaft). This can be simply realized by securing the brake or the flyback suppressor partly to the lantern shaft and partly to the lantern housing. The housing is as described above secured to the electric motor and/or to the gearbox so it is nonrotational. Very short overall length for the device is obtained by forming the brake as a single-disc brake with mechanical or magnetic actuators. The same arrangement can be used for the flyback suppressor and by using mechanical locking elements in the form of so-called sprags.

The apparatus according to the present invention is extremely simple and yet allows an electric motor or the like to be mounted on a gearbox with relative ease. Nominal misalignments between the motor output shaft and the input of the gearbox are readily compensated for so that service life of the unit is long. In addition the simplicity of the unit allows it be produced relatively economically.

BRIEF DESCRIPTION OF THE DRAWING

The above and other objects, features, and advantages will become more readily apparent from the following, reference being made to the accompanying drawing in which:

FIG. 2 is a section taken along line II — II of FIG. 1;

FIG. 5 is a section taken along line V — V of FIG. 3.

SPECIFIC DESCRIPTION

Figure 1:
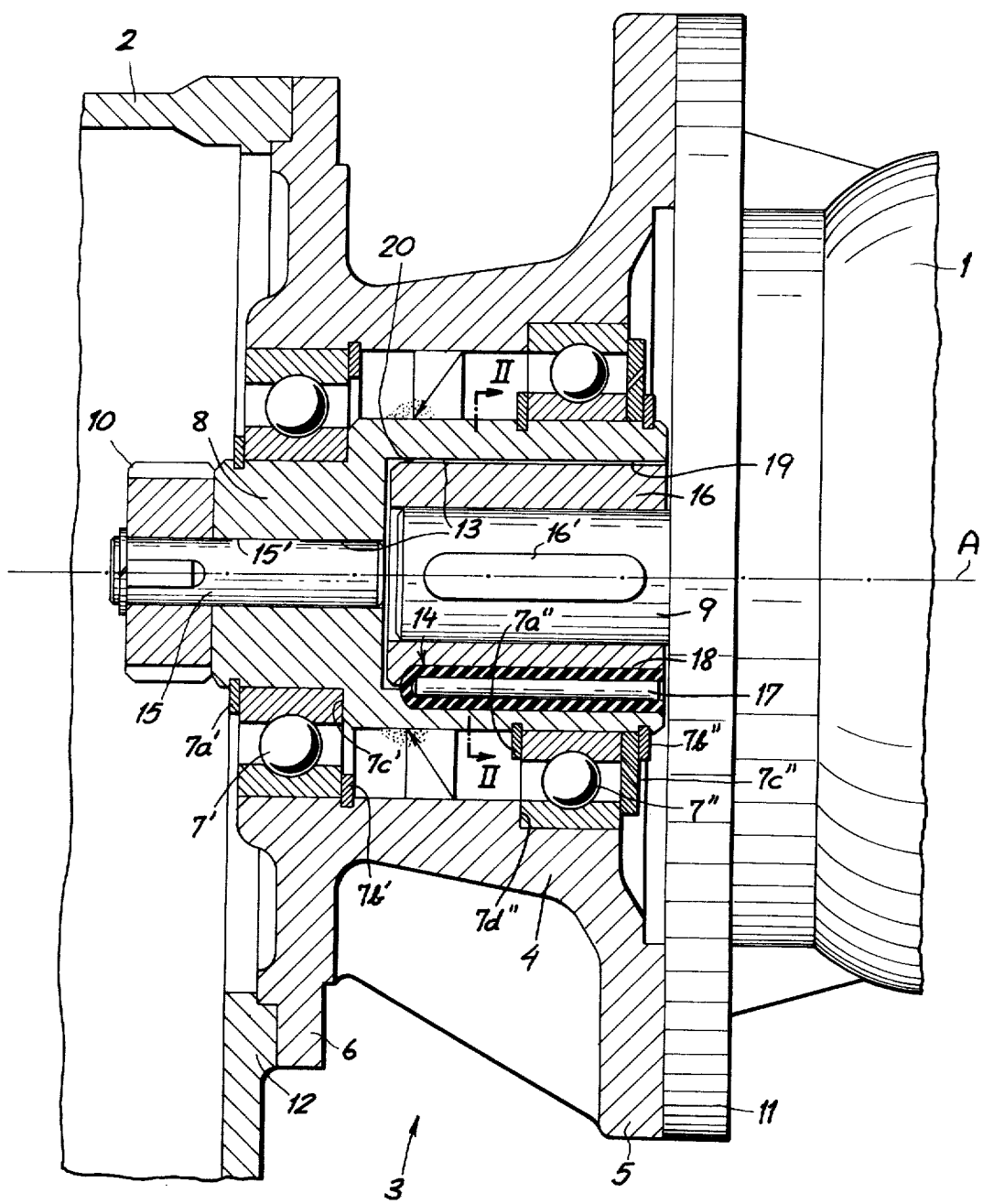
FIG. 1 is an axial section through an assembly according to the present invention.

As shown in FIGS. 1 and 2 an electric motor 1 is mounted on a gearbox 2 by means of an adapter or so-called lamp assembly 3. To this end the adapter assembly 3 has a rigid steel housing 4 formed with a flange 5 bolted to a flange 11 on the motor 1. In addition a flange 6 on the housing 4 is bolted to a flange 12 on the gearbox 2. The motor 1 has an output rod or shaft 9 which is connected via a lantern shaft 8 to a pinion 10 which meshes with the input of the gearbox 2. A pair of roller bearings 7' and 7'' support the lantern shaft 8 in the housing 4. The one bearing 7' is held between a snap ring 7a' secured in the shaft 8, and a snap ring 7b' secured in the housing 4 and rests against a shoulder 7c' formed in the shaft 8. The other bearing 7'' is secured between a pair of snap rings 7a'', 7b'' mounted in the shaft 8 and a split ring 7c''. This bearing 7'' also rests against a shoulder 7d'' formed in the housing 4. Thus the shaft 8 is rotatable about its central axis A but is axially nondisplaceable relative to the housing 4.

The pinion 10 is carried on a short rod 15 held by means of a layer 15' of cement in the small-diameter section of a stepped bore 13 passing axially through the sleeve 8.

As also shown in FIG. 2 the motor output shaft 9 carries a hub 16 to which it is keyed by means of Woodruff key 16'. The outer surface of the hub 16 and the inner wall 19 of the bore 13 at its large-diameter section defines a cylindrically annular space 20. The hub is formed with three part-cylindrical recesses 21 which are angularly equispaced about the axis A and parallel to this axis. The sleeve 8 is similarly formed with three part-cylindrical recesses 22 that register with the recesses 21. In each of the cylindrical seats formed by these paired recesses 21 and 22 there is received a respective elastic connecting member 14 of cylindrical shape. This member 14 is formed by a central steel pin 17 having a diameter $d$ greater than the radial dimension $s$ of the space 20, and a cylindrical elastomeric sleeve 18 filling the seat formed by the two recesses 21 and 22 and having an outer diameter D equal to 2.5 $d$. This resilient sleeve 18 is formed of rubber or other elastic material. It is also within the scope of the invention to eliminate the steel core 17 and use a unitary elastic cylindrical plug.

Figure 3:
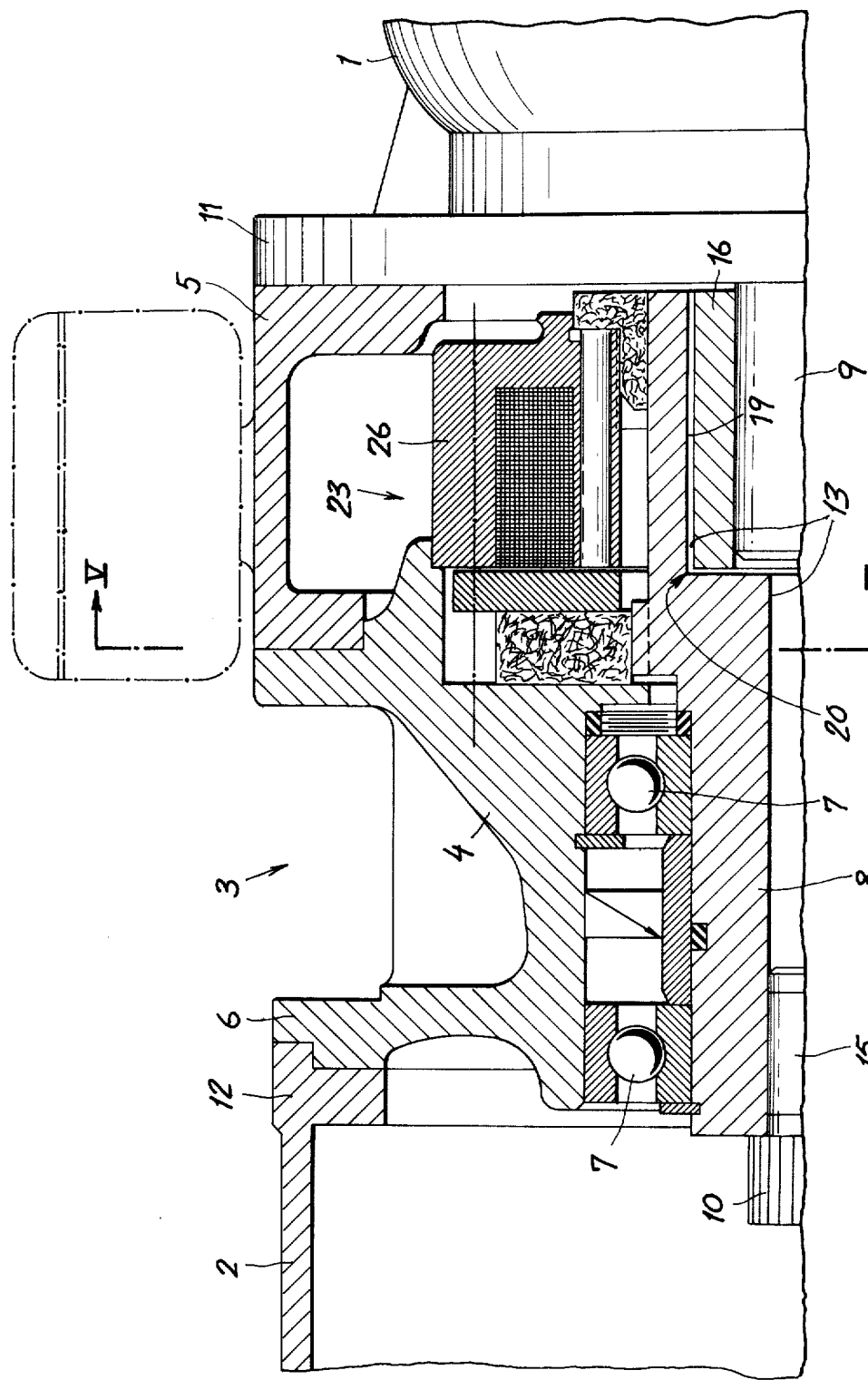
FIGS. 3 and 4 are axial sections through further arrangements in accordance with this invention.
Figure 4:
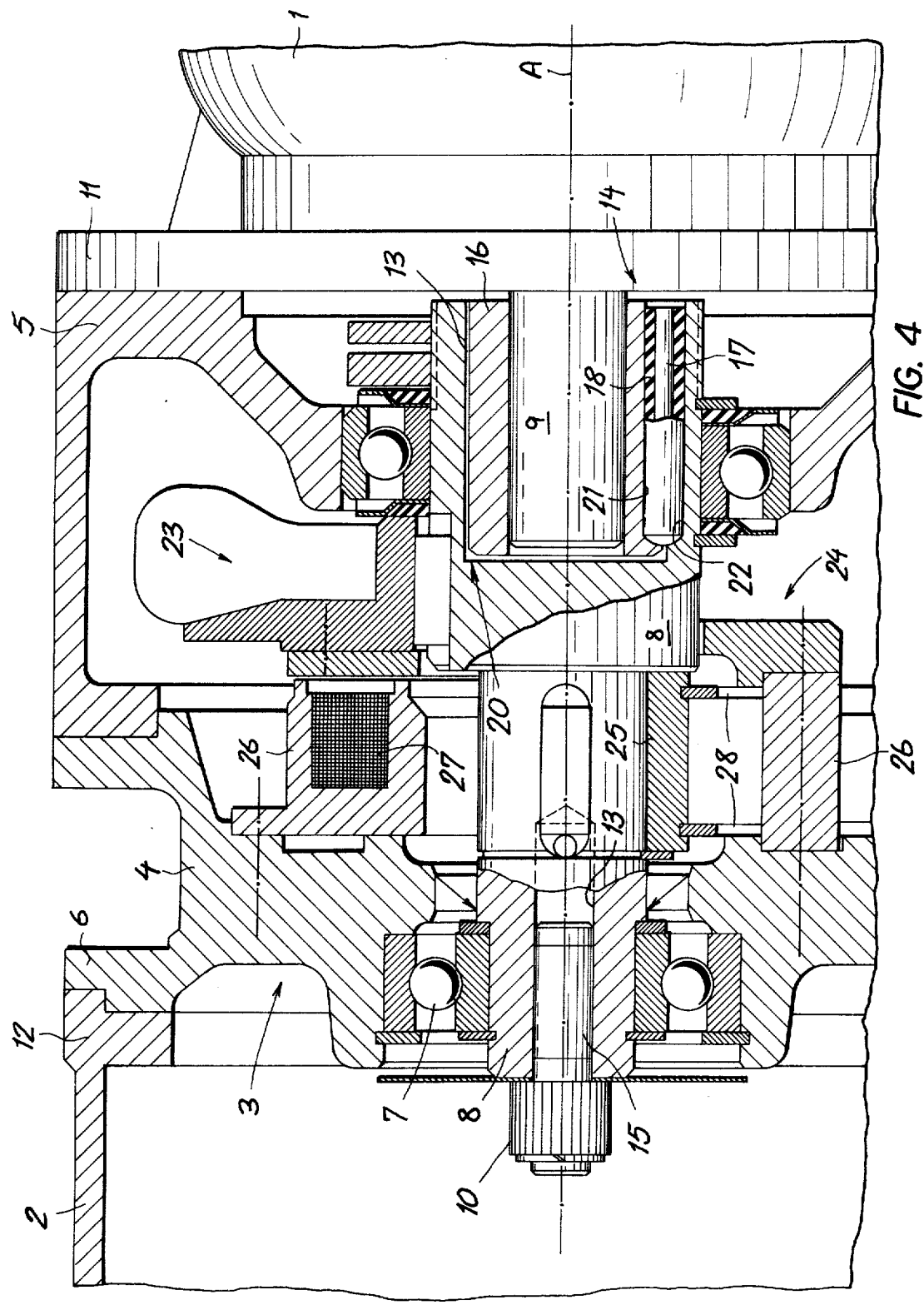

The arrangements shown in FIGS. 3 – 5 use the same reference numerals for functionally identical structures. In these assemblies there is provided a brake 23 and a flyback suppressor 24.

The brake 23 and the flyback suppressor 24 each have a part 25 rotationally secured to the shaft A and a part 26 rotationally secured to the housing 4. The brake 23 is a single-disk brake.

In FIG. 4 there is shown a single-disk brake with a permanent-magnet actuator 27.

In FIG. 3 there is shown a spring-operated single-disk brake.

The flyback suppressor 24 in FIG. 4 is shown to have mechanical locking elements 28 in the form of sprags.

The arrangement according to the present invention allows a motor to be connected to a gearbox with relative ease. It is possible to change the motor readily, as the elastic connections can be pulled apart with little difficulty. In addition, slight misalignments between the motor shaft and the input of the gearbox are compensated for fully without damage to either the motor or the gearbox.

I claim:

1. An assembly for connecting an output shaft of a motor or the like to the input of a gearbox or the like, said assembly comprising:
   a rigid housing having on one side a motor flange securable to said motor and on the other side a gearbox flange securable to said gearbox;
   a rigid connecting body journaled in said housing and rotatable therein about an axis extending between said sides, said connecting body having one end turned toward said gearbox and provided with a pinion connected to said input thereof and another end turned toward said motor and having an axial bore;
   a sleeve keyed to said shaft and received with clearance in said bore, said sleeve and the wall of said bore being formed with angularly spaced pairs of mutually confronting axially extending recesses;
   a respective elastically deformable pin received in each pair of recesses and bridging the recesses of each pair for rotataionally interconnecting said sleeve and said body, each of said pins including an elongated steel core received with clearance between the recesses of the respective pair and an elastomeric sheath covering the respective core; and
   a respective device in said housing mechanically controlling relative displacement of said housing and said body, said device having respective parts connected to said housing and body.

2. the assembly defined in claim 1 wherein said body is a further sleeve, said pinion having a rod fixed in one end of said further sleeve.

3. The assembly defined in claim 2, further comprising adhesive between the pinion rod and said further sleeve.

4. The assembly defined in claim 1, wherein said device is a brake in said housing operable on said sleeve.

5. The assembly defined in claim 4 wherein said brake comprises a first part secured to said housing and a second part secured to said sleeve.

6. The apparatus defined in claim 4 wherein said brake is a single-disk brake.

7. The assembly defined in claim 1, wherein said device is a flyback suppressor having one part secured to said sleeve, another part secured to said housing, and mechanical actuating elements engageable therebetween.

* * * * *